March 27, 1956 P. T. CHAMPLIN, JR 2,739,498
BOTTLE CAP LIFTER
Filed June 1, 1953
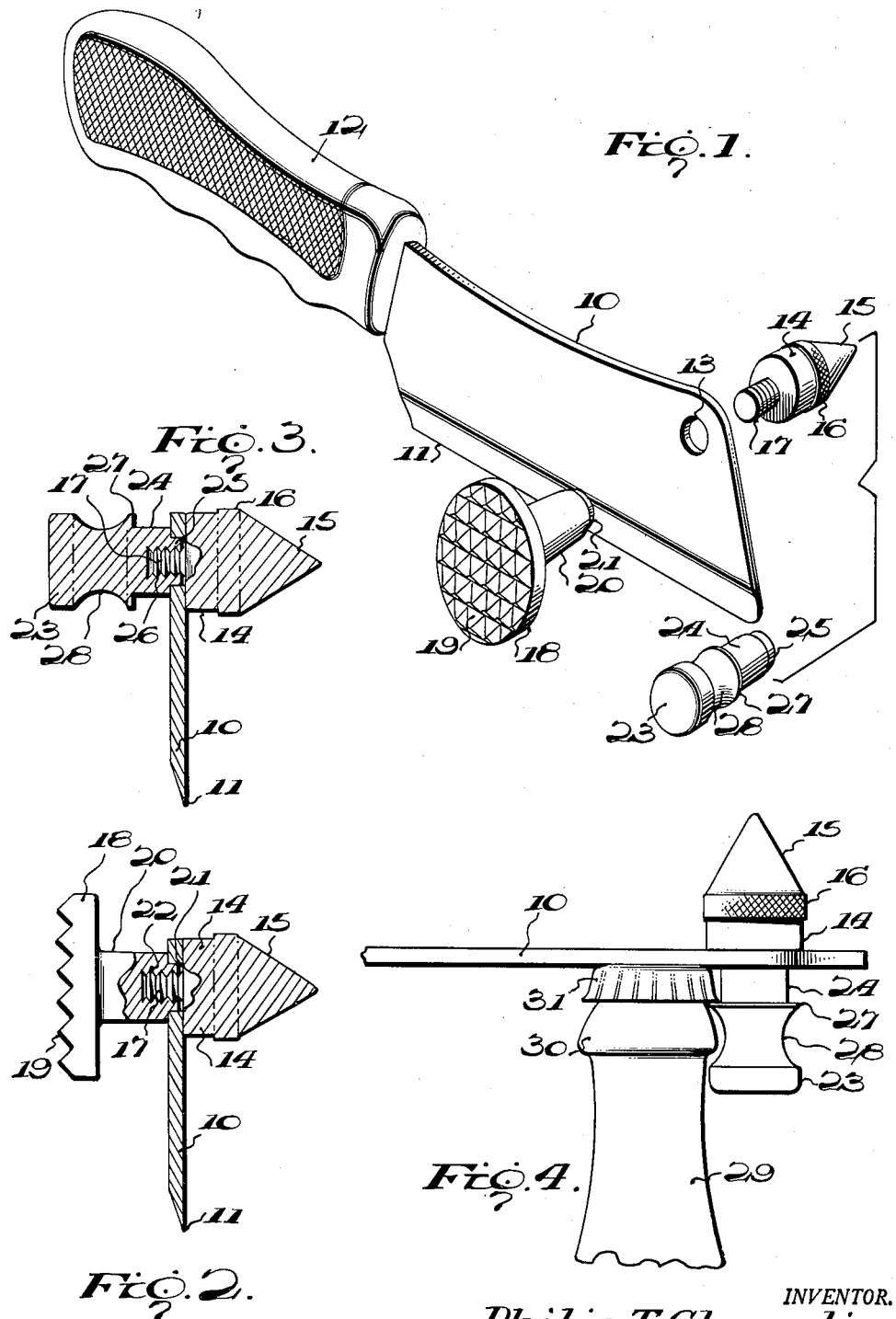
INVENTOR.
Philip T. Champlin, Jr.
BY
ATTORNEY.

United States Patent Office 2,739,498
Patented Mar. 27, 1956

2,739,498

BOTTLE CAP LIFTER

Philip T. Champlin, Jr., Little Valley, N. Y.

Application June 1, 1953, Serial No. 358,715

1 Claim. (Cl. 81—3.46)

This invention relates to an improved kitchen tool.

As will be appreciated, it is becoming increasingly customary, in many homes of today, to find a light cleaver for cutting meat, a separate tool for tenderizing meat, a separate pick for breaking ice into chaunks small enough to be used in making ice water and the like, a separate light hammer for driving tacks, or small nails, and almost indispensable, a separate bottle cap remover. However, so many distinct and separate tools unavoidably clutter kitchen drawers, and so often litter work space.

The present invention therefore seeks to provide a tool embodying a light kitchen cleaver, wherein an ice pick may be attached to the cleaver by a knob forming a meat tenderizer, when the cleaver will serve as a lever for manipulating either the pick or the tenderizer, wherein, also, the pick may be attached to the cleaver by a knob forming a hammer head, when the cleaver will serve as a lever for manipulating either the pick or the hammer head, and wherein the hammer head will be provided with a shoulder adapted to engage beneath the lower edge of the cap of a bottle, so that the cleaver may be used for removing the cap from the bottle.

Other and incidental objects will appear as the description of the invention proceds, and in the drawings:

Figure 1 is a perspective view of my improved tool showing the three attachments for the cleaver employed.

Figure 2 is a vertical, detail section showing the pick and tenderizer attached to the cleaver.

Figure 3 is a vertical, detail section showing the pick and hammer head attached to the cleaver.

Figure 4 is a detail elevation showing the manner of use of the device to remove a bottle cap.

Referring now more particularly to the drawings, I provide a cleaver embodying a flat, oblong blade 10 of uniform thickness and formed with smooth side faces, the lower margin of the blade being beveled at one side face thereof to provide a cutting edge 11. Fixed to the blade at its upper rear corner is a suitable handle 12 which may be of any approved material, and formed through the blade near its upper forward corner is a circular opening 13.

In conjunction with the cleaver, I provide an ice pick 14, the forward end of the cylindrical body of which is tapered to form a conical tip 15 for piercing ice, while the rear end of said body is flat. Surrounding the body of the pick at the base of the conical tip thereof is a knurled band 16 which may be grasped for turning the pick, and rising from the rear end of the body axially thereof is a threaded stud 17.

I further provide a meat tenderer 18, the enlarged circular head of which is formed with a striking face having suitable teeth 19 thereon, and rising axially from said head is a tapered, cylindrical shank 20 provided at its free end with a circular centering boss 21 the height of which is less than the thickness of the blade 10 of the cleaver. Formed in the shank 20 axially thereof is a threaded socket 22 extending through said boss.

As shown in Figure 2 of the drawings, the boss 21 of the shank 20 of the meat tenderer 18 is adapted to removably fit in the opening 13 of the blade 10 of the cleaver for centering said shank with respect to said opening, so that the shank is seated flat against the blade at one side thereof, while the stud 17 of the pick 14 may be inserted in said opening from the opposite side of the blade 10 and screwed into the socket 22. The meat tenderer 18 thus provides a knob detachably securing the pick firmly fixed to the blade 10, which latter supports the parts in position projecting from the blade at opposite sides thereof.

As will now be appreciated, the cleaver may, when the pick 14 and tendered 18 are attached thereto, be grasped by the handle 12 and the cleaver used as a lever for manually pounding the pick against a block of ice, for instance, or by turning the cleaver over side for side, be used as a lever for pounding the teeth 19 of the tenderer 18 into a piece of meat.

I further provide, in conjunction with the cleaver, a cylindrical hammer head 23 flat at its outer end to form a striking face and formed at its inner end portion with a reduced shank 24 flat at its free end. Rising from the free end of the shank is a circular boss 25 of less height than the thickness of the blade 10 of the cleaver, and formed through said boss axially of the shank is a threaded socket 26. Defined at the base of the shank 24 is a circular shoulder 27, and lying between said shoulder and the outer end of the head is a concave, annular groove 28.

As shown in Figure 3 of the drawings, the boss 25 of the shank 24 of the hammer head 23 is adapted to removably fit in the opening 13 of the blade 10 of the cleaver for centering the shank with respect to said opening, so that the free end of the shank seats flat against the blade at one side thereof. The stud 17 of the pick 14 may then be inserted into said opening from the opposite side of said blade and screwed into the socket 26. The hammer head 23 thus provides a knob detachably securing the pick firmly seated aagainst one side of the blade in alignment with the head at the opposite side of the blade.

As will be seen, the cleaver may, when the pick 14 and hammer head 23 are attached thereto, be used as a lever for manually manipulating the pick, as previously described, or, by turning the cleaver over side for side, be used as a lever for manipulating the hammer head 23 to drive tacks, or small nails.

In Figure 4 of the drawings, I have shown the manner in which the head 23 is used to remove a bottle cap. The neck of a conventional bottle is indicated at 29, and formed on the neck to surround the mouth of the bottle is the usual thickened lip 30. Closing the bottle is a conventional cap 31 resiliently engaged with said neck. To remove the cap, the blade 10 of the cleaver is laid across the upper end of the cap flat thereagainst to dispose the head 23 at the lower side of the blade lying close to the bottle neck. As will be perceived, the groove 28 in the head will then accommodate the lip 30 and permit the shoulder 27 of the head to be engaged beneath the lower edge of the cap. Thus, by using the bottle and cap as a fulcrum, the blade 10 may be rocked against the cap for swinging the head 23 upwardly and prying the cap from the bottle.

Having thus described my invention, I claim:

In a kitchen tool, a flat elongated plate provided at its rear end with a handle and formed near its forward end with an opening, a cylindrical head extending laterally from the plate at one side thereof and provided at its inner end with a reduced shank abutting the plate and defining an annular overhanging shoulder at the base of the shank spaced by the shank away from said plate a distance greater than the width of the rim of a cap closing the mouth of a bottle at the upper end of the neck thereof, and means at the opposite side of the plate having a stud thereon extending through said opening and screwed into said shank detachably securing the head to the plate, the plate being adapted to extend across said cap to dispose the head at the side of the neck of the bottle remote from said handle and the outer end portion of the head being formed with an annular groove extending from said shoulder to a point near the free end of the head and disposed to receive a lip encircling the mouth of the bottle when the plate lies flat against the cap and provide clearance below said shoulder permitting the shoulder to clear the lower edge of said cap, the free end of the head providing a stop at the outer end of said groove disposed to engage the neck of the bottle and limit the plate to lie flat against said cap and position said groove to receive said lip, whereby said shoulder of the head may be engaged beneath the lower edge of the rim of the cap and the handle swung downwardly to rock the forward end of said plate upwardly against the cap for removing the cap from the bottle.

References Cited in the file of this patent

UNITED STATES PATENTS

| Number | Name | Date |
|---|---|---|
| 128,020 | Conklin | June 18, 1872 |
| 832,962 | Fellows | Oct. 9, 1906 |
| 1,118,010 | Huhn | Nov. 24, 1914 |
| 1,194,838 | Hachman | Aug. 15, 1916 |
| 1,996,949 | Bosworth et al. | Apr. 9, 1935 |
| 2,461,040 | Geronimo | Feb. 8, 1949 |
| 2,609,601 | Husted | Sept. 9, 1952 |